(No Model.)
H. A. VOSE.
OVERHEAD TRUCK LIFTER AND SHIFTER.
No. 470,851. Patented Mar. 15, 1892.
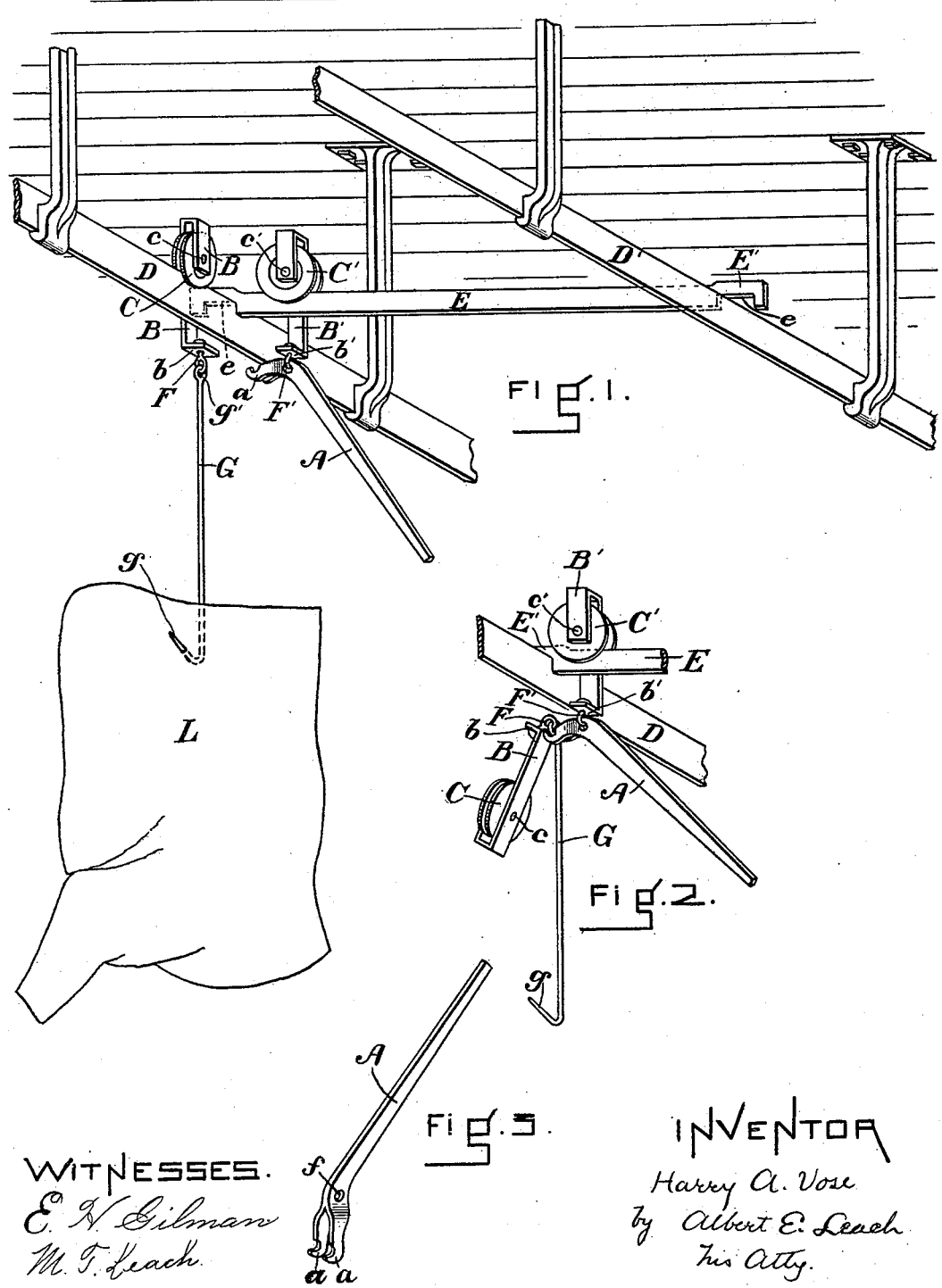
WITNESSES.
E. N. Gilman
M. T. Leach
INVENTOR
Harry A. Vose
by Albert E. Leach
his Atty.

United States Patent Office.

HARRY A. VOSE, OF NATICK, ASSIGNOR OF ONE-SIXTH TO WILLIAM F. GLENN, OF LEXINGTON, MASSACHUSETTS.

OVERHEAD-TRUCK LIFTER AND SHIFTER.

SPECIFICATION forming part of Letters Patent No. 470,851, dated March 15, 1892.

Application filed February 14, 1891. Serial No. 381,421. (No model.)

*To all whom it may concern:*

Be it known that I, HARRY A. VOSE, of Natick, in the county of Middlesex and Commonwealth of Massachusetts, have invented a certain new and Improved Overhead-Truck Lifter and Shifter, of which the following is a full specification.

My invention consists of an improved lifting and shifting device especially adapted for use in connection with overhead tracks, with trucks running thereon for conveying merchandise from one part of a factory or storehouse to another. It is especially useful in slaughter-houses and warehouses wherein dressed meat is handled in quantity. In such houses there are generally several tracks running parallel to each other, certain of which tracks are used for temporary storage and are kept constantly full of trucks bearing hooks having thereon fore quarters or hind quarters of meat, while certain other tracks are kept free, being used as outlet-tracks, onto which trucks bearing meat are to be shifted from the former storage-tracks whenever said meat is to be run out. In such cases, whenever a truck is to be shifted from one track to another two men are necessary, one of whom is obliged to carry the meat with the hook therein, while the other lifts the truck from the first track and adjusts it upon the second. With my improved device one man only is necessary to shift the truck.

I will proceed, for convenience, to describe my device as applied to the shifting of dressed meat in the manner just set forth, though it is obviously equally applicable to various other merchandise and in a variety of ways.

Referring to the accompanying drawings, Figure 1 is a perspective view illustrating my device, showing the shifting truck at rest. Fig. 2 shows the same shifting truck in operation, and Fig. 3 shows in front perspective the hooked lever of the shifter.

D D' are overhead tracks, on which are adapted to run trucks of well-known construction, consisting of an inverted-U-shaped frame B, having journaled therein the grooved wheel C, which rolls upon the track. One arm of the frame B extends downward and has the flange b under the track, in which flange is swiveled the eye F. Into this eye F is linked the eye g' at the top of the meat-hook G, the lower bent end g of which is hooked into the meat L. Suppose the track D to be used as a storage-track and to be kept constantly full of trucks B C, having meat on the hooks thereof. D' is the outlet-track, onto which from time to time trucks are to be shifted from track D to be run out.

E is a light movable track adapted to connect the two tracks D D' at any desired points, being laid across the two tracks, as shown in Fig. 1. This movable track is preferably grooved out, as at e, at the ends thereof, the grooved ends being preferably raised above the main or central portion of the track, as at E', so that the track E may set firmly upon the stationary tracks without being fastened thereon. The grooves e are preferably made wider than the thickness of the stationary tracks in order that the movable track may, if desired, be set obliquely from one stationary track to the other. The upper portion B' C' of the shifting truck, which rolls upon the movable track E, is preferably similar to that of the ordinary truck just described.

A is a lever, the fulcrum of which is swiveled in the flange b' of the downwardly-extending arm of the truck-frame B'. As here shown, the fulcrum of the lever A consists of the eye F', which passes through the hole f in the lever. The long arm of the lever A acts as a handle, while the short arm is bent downward and bifurcated, the two divisions a a being hook-shaped, the construction being such that when the two trucks B C and B' C' are in the right position relative to each other the bifurcated hooked end a a may embrace the shank of the hook G under the eye g'.

The operation of my improved shifter is as follows: Suppose it is desired to shift the truck B C, with its load, from the track D to the track D'. The movable track E is placed in position on the two tracks D D', being placed as near as possible to the truck-wheel C. The truck B' C' is then placed on the movable track and moved up as far as it will go toward the track D, the raised portion E' serving as a stop to prevent the truck from running over too far. The hooked lever A is then turned so as to be in the same plane as the shank of the hook G, and the bifurcated end *a a* is hooked under the eye *g'* at the top of the hook G, one arm *a* of the forked end passing on each side of the shank of the said hook G. The operator then grasps with one hand the frame of the truck B C and with the other presses down the handle or long arm of the lever A, which lifts the truck B C off the track. While still holding down the handle the operator turns down the truck B C, as shown in Fig. 2, and, letting it thus hang, rolls the shifting truck B' C' along the movable track E to the other end thereof, so that it bears the same relative position to the track D' that it formerly did to track D. The operator then turns the handle-lever A half round on its pivot and with his other hand lifts the truck B C up over the track D', lowering it down thereon.

The truck B' C', with the lever A swiveled thereto, is adapted for lifting and transporting general merchandise of various kinds over an ordinary track.

I claim—

1. The combination, with a truck B' C', of a one-piece lever A, pivotally connected and swiveled to the frame thereof, said lever being provided with the downwardly-bent bifurcated divisions *a*, hook-shaped at the outer ends and parallel to each other, adapted to embrace the shank of a meat-hook and engage with an eye at the top thereof, substantially as described.

2. In a truck lifter and shifter, a movable track having grooved ends, in combination with a truck B' C', having a hooked lever pivotally connected and swiveled to the frame thereof, arranged and operating substantially as and for the purposes described.

3. In a truck lifter and shifter, a movable track E, having raised ends E', grooved at *e* on the under side thereof, in combination with a truck B' C', having a hooked lever pivotally connected and swiveled to the frame thereof, substantially as and for the purposes described.

In witness whereof I have hereunto set my hand.

HARRY A. VOSE.

Witnesses:
ALBERT E. LEACH,
M. T. LEACH.